Oct. 9, 1934.  G. T. KIMURA  1,976,284
KITCHEN MACHINE
Filed Jan. 5, 1933   4 Sheets-Sheet 1

Inventor
George T. Kimura
By Clarence A. O'Brien
Attorney

Oct. 9, 1934.　　　G. T. KIMURA　　　1,976,284
KITCHEN MACHINE
Filed Jan. 5, 1933　　　4 Sheets-Sheet 2

Inventor
George T. Kimura
By Clarence A. O'Brien
Attorney

Oct. 9, 1934.     G. T. KIMURA     1,976,284
KITCHEN MACHINE
Filed Jan. 5, 1933     4 Sheets-Sheet 4

Inventor
George T. Kimura
By Clarence A. O'Brien
Attorney

Patented Oct. 9, 1934

1,976,284

UNITED STATES PATENT OFFICE 1,976,284

KITCHEN MACHINE

George T. Kimura, Sacramento, Calif.

Application January 5, 1933, Serial No. 650,318

2 Claims. (Cl. 17—32)

This invention relates to improvements in culinary kitchen machines intended to perform the work incident to chopping, mixing and padding food; as well as the work incident to the extracting of juices from fruit, the mixing of beverages, and the beating of eggs or the like.

The invention consists in the provision of a machine of the character above mentioned which consists in a minimum number of parts, is efficient in operation, requires no high degree of skill to operate, and is economical.

The invention together with its numerous objects and advantages will be best understood from a study of the following description, taken in connection with the accompanying drawings wherein:

Figure 3 is an end elevational view, certain parts being broken away to illustrate certain details of construction to be hereinafter more fully referred to.

Figure 6 is a perspective view of a nozzle member.

Figure 7 is a plan view of one of the pressing or padding drums.

Figure 8 is a plan view of a meat chopper.

Figure 9 is a plan view of a grinding disk.

Figure 1:
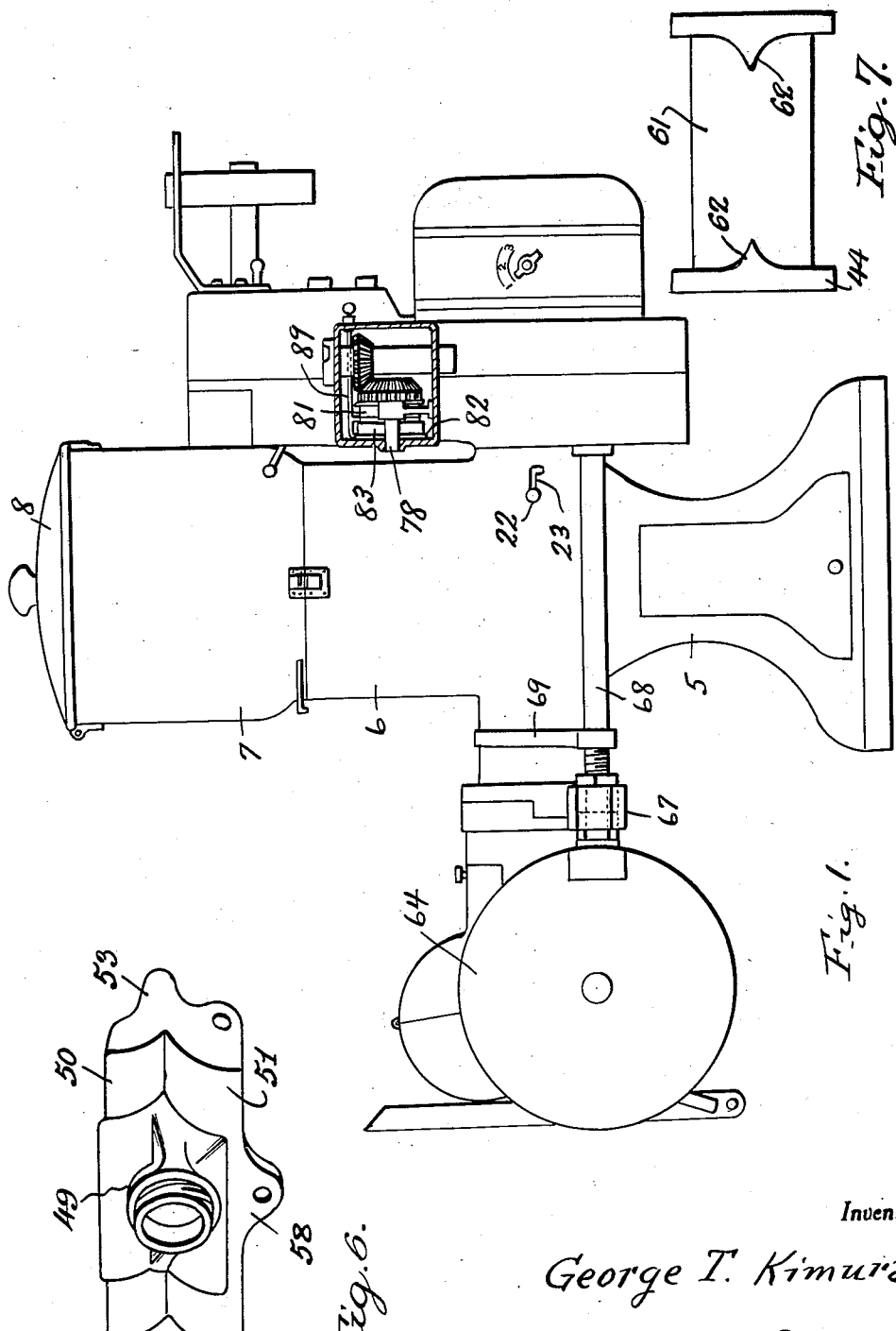
Figure 1 is a side elevational view of the machine, a gear case being shown in transverse section.

Referring by reference numerals to the drawings it will be seen that 5 designates a pedestal upon which is suitably mounted a casing 6 having hinged to the upper edge thereof a hopper 7 provided with a suitable lid 8. The hopper 7 is also provided with a slide bottom 9 that operates in a groove 10 and has an end 9a extending through a slot in the wall of the hopper to facilitate shifting of said bottom 9.

Rotatably mounted in the bottom portion of the hopper 7 are two oppositely rotating stirrers or agitators 10 mounted on shafts 11 and 12. The shafts 11 and 12 are connected by gearing 13 for transmitting movement of one shaft to the other of said shafts.

Rotatably mounted in the bottom portion of the casing 6 is a feed screw 14 adapted to be driven from a three speed electric motor suitably mounted laterally of the casing 6, and designated generally by the reference character 15.

The motor 15 is disposed at one side of an elongated vertical gear casing 16 that is suitably mounted laterally of the casing 6 and into which one end of shaft 17 extends. As will be noted from a study of Figure 2 the conveyor 14 is mounted on the shaft 17. Mounted in the gear case 16, is a partition 18 which suitably supports a stub shaft 19 that on one end is provided with a gear 20 adapted to engage the beveled gear part of a combine bevel and wheel gear 21 that is slidably splined to the shaft 17. The gear 21 is provided with a hub portion suitably grooved for operative engagement with a shifting fork 22, the handle portion of which fork 22 operates in an L-shaped slot 23 provided in the wall of the casing 6. (See Figures 1 and 2). Drive is transmitted from the armature shaft 24 of the motor 15 to the shaft 19 through the medium of gearing 25, 26, 27 and 28, gear 26 being relatively large and gear 27 being in the nature of a pinion gear, and both of the gears 26, 27 are mounted on a shaft 29 suitably journalled in the upper portion of the gear case 16.

Gear 27 is also in mesh with a gear 30 provided on a sub shaft 31 suitably mounted in the gear case 16. Slidably splined to the shaft 31 is a gear 32 adapted to be moved into and out of engagement with a gear 33 provided on the stirrer or agitator shaft 11. For shifting the gear 32, there is provided on the gear a grooved hub with which is engaged a suitably mounted shifting lever 34. (See Figure 2). Manifestly when the gear 32 is engaged with the gear 33 drive is transmitted from the shaft 29 to the shaft 31, and from the shaft 31 to the shaft 11 for driving the shafts 11 and 12 to operate the stirrers or agitators 10. Similarly, when gears 32, 33 are engaged, and gears 20, 21 are engaged, the stirrers 10 will be driven simultaneously with the screw 14; and the food products in the hopper 7, which product may be in the nature of a mixture of meat, onions and other ingredients used in making "hamburger" may, after being thoroughly agitated, pass from the hopper 7 into the casing 6 to be conveyed by the screw 14 to the outlet end 35 of the casing 6. Obviously when it is desired to have the meat products passed from the hopper 7 down into the casing 6 the bottom 9a of the hopper is slid toward the left in Figure 2, thereby establishing communication between the hopper 7 and the casing 6.

Figure 10:
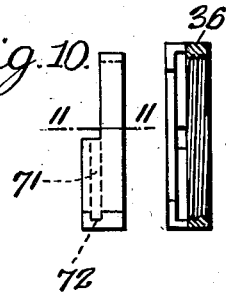
Figure 10 is a side elevational view of a female coupling member.
Figure 11:
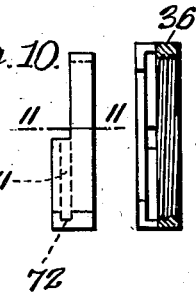
Figure 11 is a sectional view taken substantially on the line 11—11 of Figure 10.

Screwed on to the outlet end 35 of the hopper 6 is a rimmed disk like female coupling member 36, the construction and shape of which can be best determined from a study of Figures 10 and 11.

When the device is being used in the manner above suggested for making hamburger there is mounted at the outlet end 35 of the casing a device 37, which device 37 may be termed a meat flattening device, or padder, or press, the object of the device being to press the food products into a homogeneous mass, and the mass then sliced into smaller portions that are delivered on to a tray 38, the food products delivered on to the tray 38 being in the nature of "meat balls" that are in readiness for cooking.

The device 37 comprises a substantially cylindrical casing 38a consisting of two half sections hinged as at 39 and opposite to the hinge 39 secured together through any suitable device such as indicated generally at 40. Suitably journalled in the casing 38a are shafts 41, 42 on which are mounted coacting rollers or drums 43, 44. The shafts 41, 42 are connected at one end through the medium of gearing 45. At one side thereof the casing 38a is provided with a neck 46 provided with a male coupling member 47 adapted to engage with the female coupling member 36 in a manner apparent for supporting the casing with the neck 46 thereof alined with the outlet 35. Suitably provided internally of the neck 46 is a socket 48 into which is screw threaded the threaded end of a nozzle 49. At its discharge end the nozzle 49 is provided with a shield member having upper and lower transversely curved portions 50, 51 that are disposed concentric to the rollers or drums 43, 44 in the manner suggested in Figures 4 and 5. At the ends of the portions 50, 51, the shield is provided with flanges 53 to which are suitably secured the ends of brace arms 54, provided in the manner shown in Figure 4 for bracing the shields relative to the shaft 42. As will be noted the outlet end of the nozzle 49 is so arranged as to discharge the food products passing therethrough between the peripheries of the drums 43, 44, and obviously as the food products pass between the drums they are flattened and mashed into a homogeneous mass.

Opposite to the neck 46 the casing 38a is provided with an outlet 55 through which the mass will pass. Leading downwardly from the outlet 55 is a chute 56, and pivoted to the lower end of the chute 56 is the tray 38 for receiving the food products. A foldable brace 57 is connected with the chute 56 and the tray 38 for bracing the tray and holding the same in horizontal position.

Figure 4:
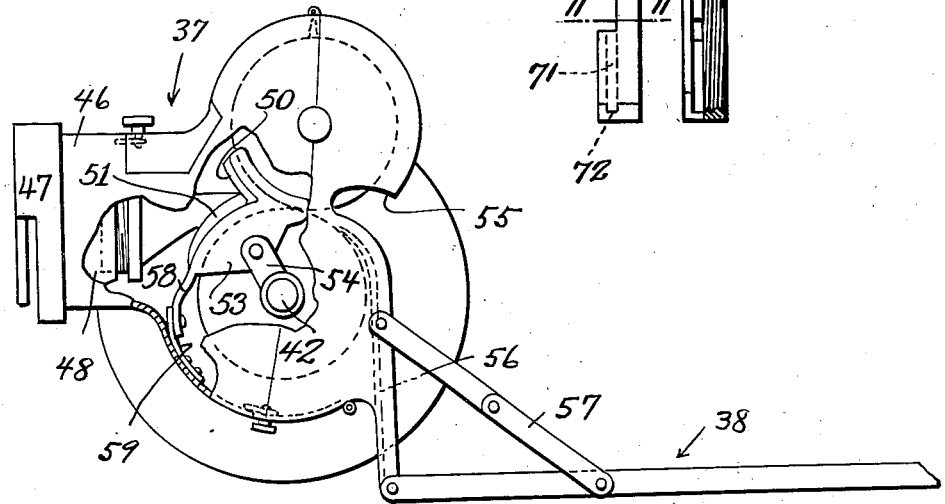
Figure 4 is a side elevational view of a flattening or padding press, certain parts being broken away and shown in section.
Figure 5:
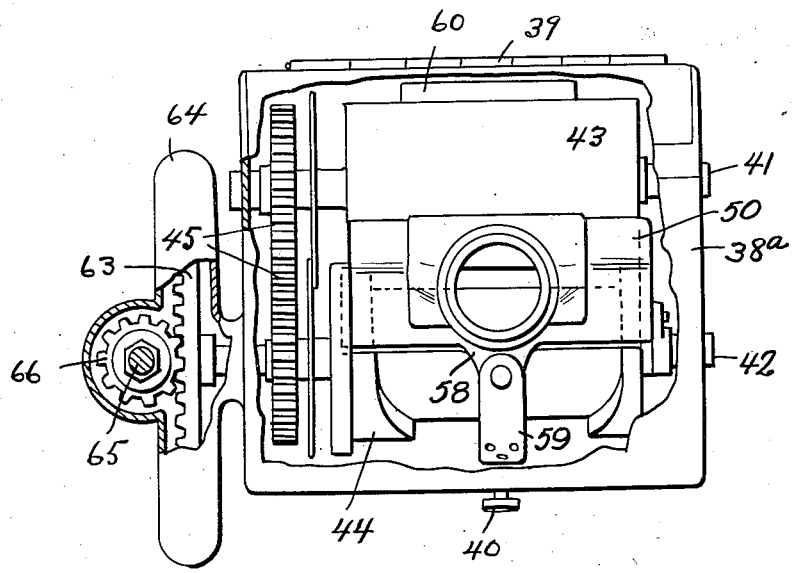
Figure 5 is a view taken at right angles to Figure 4, certain parts being removed, and other parts being broken away and shown in section.

If desired the shield portion at the outlet end of the nozzle 49 may be further braced and supported by providing the portion 51 of the nozzle with a lip or tongue 58, and securing said lip or tongue 58 to a bracket member 59 suitably mounted within the casing as shown in Figures 4 and 5.

On the periphery of the roller 43 there is provided a knife 60 while the periphery of the roller 44 is grooved as at 61 and is provided with alined ribs 62 that cooperate with the knife 60 in a manner to cause portions of the homogenous mass of food products to be severed prior to the discharge of the mass from the casing 38a.

Figure 2:
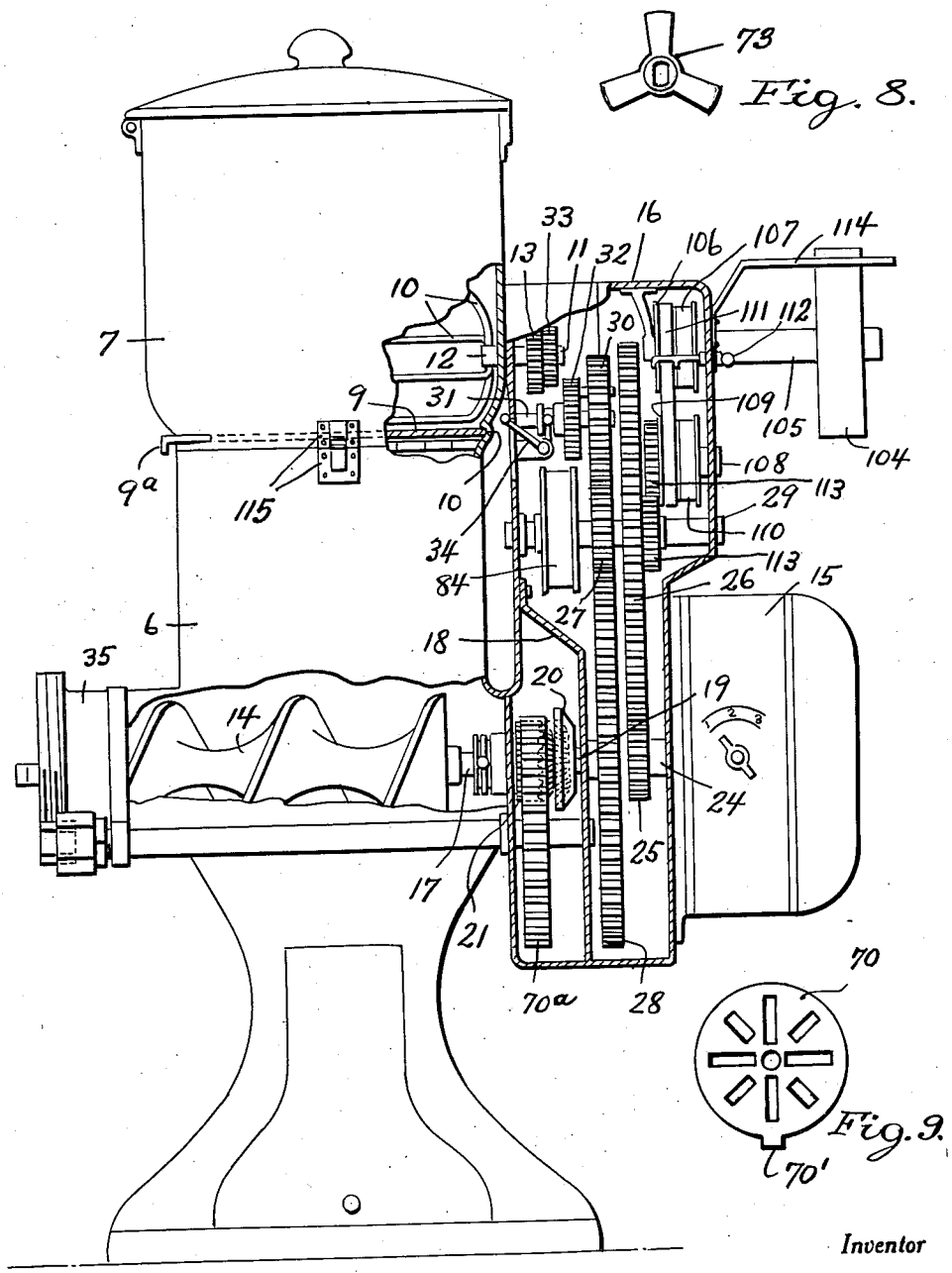
Figure 2 is a side elevational view of the machine, certain parts being broken away and shown in section and other parts being removed.

For driving the shafts 41, 42 there is also provided on the shaft 42 a relatively large gear 63 mounted in a circular gear case 64 formed at one end of the casing 38. Also mounted in the gear case 64 is a shaft 65 on which is a gear 66 meshing with the gear 63. One end of the shaft 65 is adapted to be coupled through the medium of a suitable coupling device 67 with a shaft 68 that is supported at one end by a suitable bracket 69, and which at its other end terminates within the gear case 16 as shown in Figure 2 and is provided on this last named end with a gear 70a that is in mesh with the wheel portion of the gear 21. Thus it will be seen that drive will be transmitted from the shaft 17 to the shaft 68, and from the shaft 68 to the shaft 65 for driving the gear 63 and thereby simultaneously rotate the coacting rolls or drums 43. The use of the device for making hamburger and the like is thought apparent from the above description.

Now when the device is to be used as a meat chopper, all that is necessary, is to swing the hopper 7 on its hinge to uncover the top of the casing 6; and to remove the device 37. Upon removal of the device 37 a grinding disk of the character shown in Figure 9 and designated by the reference character 70 is arranged in the coupling member 36, said member being provided with a grooved portion 71 for receiving the disk 70 and being also provided with a socket 72 for receiving a lug 70' provided on the edge of the disk to retain the disk 70 against rotative movement. For chopping the meat there is also provided a multi-bladed chopper 73 of the type shown in Figure 8 and which is adapted to be readily mounted on the outer end of the shaft 17. With the disk 70 and chopper 73 in position the meat to be chopped is placed directly into the casing 6 and through the medium of the conveyor 14 is conducted to and through the radial slots in the disk 70, and as the meat particles pass through the slots of the disk 70 they are acted upon by the blades of the revolving chopper 73 in a manner to comminute the pieces of meat. Of course a bowl or other suitable receptacle may be held or otherwise suitably provided at the outlet end 35 of the device for receiving the chopped meat.

The gear case 16 is provided with a lateral extension 74 in which is journalled a vertical tubular shaft 75 provided with internal keys (not shown). On the shaft 75 is a beveled gear 76 that is in mesh with a combination gear 77 provided on one end of a stub shaft 78 suitably mounted within the extension 74 and in a manner clearly shown in Figure 1. The gear 77 is also in mesh with a gear 79 fixed to a shaft 80 also journalled in the extension 74. On the shaft 80 is a fixed pulley wheel 81 and a loose pulley wheel 82. Adapted to selectively train over the pulleys 81, 82 is a drive belt 83 that is trained over a relatively large pulley 84 which is fixed on the aforementioned shaft 29.

Figure 3:
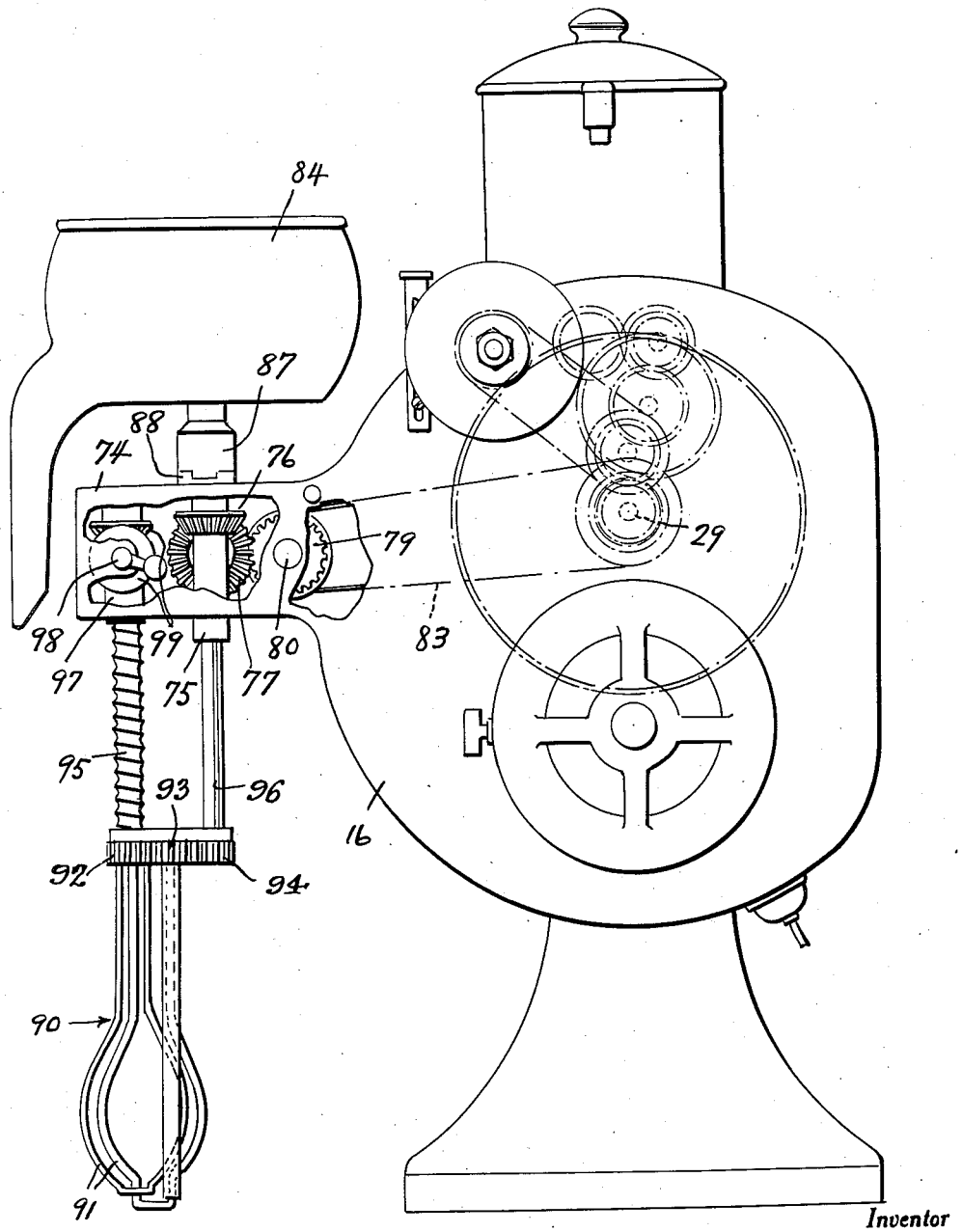

When it is desired to use the extractor 84 the same is mounted on the device in the manner suggested in Figure 3, and interengaging means 87, 88 are provided on the extractor 84 and on top of the extension 74 to secure the bowl of the extractor against rotative movement when the extractor is mounted in the manner shown in Figure 3. To drive the shaft 75 for operating the bulb of the juice extractor 84, 85, the belt 83 is trained over the fixed pulley 81, and when the circuit to the motor 15 is closed drive will be transmitted to the shaft 80 and from the shaft 80 to the shaft 78 for driving the shaft 75 to rotate the gouging or bulb member of the extractor for the purpose of gouging out the fruit cells or interiors of the fruit, the juice of the fruits being of course caught in the bowl of the extractor and flowing down through the spout of the extractor in a manner apparent. When it is not desired to use the extractor 84, the belt 83 is trained over the idler pulley 82. For shifting the belt 83 there is provided a suitable shifting lever 89 as shown in Figure 1.

An egg beater is shown in Figure 3 and designated by the reference character 90. For revolving the blades 91 of the egg beater there are provided gears 92, 93, 94 and it will be noted that gear 92 is operatively connected with a spirally threaded shaft 95 while gear 94 is operatively connected with a keyway equipped shaft 96.

In using the egg beater 90 shaft 96 is engaged with the shaft 75 while the shaft 95 is suitably engaged with a second hollow or tubular shaft 97 mounted in the casing extension 74. It will thus be seen that with the egg beater mounted in the manner shown in Figure 3 power from shaft 75 may be utilized for driving or operating the beater. Means is also provided for manually operating the egg beater 90, and in the present instance this means consists in the provision of a handle equipped shaft 98 suitably mounted in the casing extension 74 and having drive connection with the shaft 97 through the medium of bevel gearing 99. Obviously by manually rotating shaft 98 drive will be transmitted to the shaft 95 of the egg beater for revolving the blades 91 of said beater.

The device also includes a grinding attachment, and the same in the present instance includes an emery wheel 104 mounted on a shaft 105 that has one end thereof suitably mounted within the gear case 16. On the said one end thereof shaft 105 is provided with a fixed pulley 106 and a loose pulley 107. Also mounted in the casing 16 is a stub shaft 108 on which is mounted a fixed pulley 109 and a loose pulley 110. Adapted to be trained over the pulleys is a belt 111, and for shifting the belt from the pulleys 106, 109 on to the pulleys 107, 110 there is provided a suitable shifting device 112. The stub shaft 108 is driven from the shaft 29 through the medium of gearing 113. Obviously when drive is transmitted to the shaft 29 from the motor 15, drive from the shaft 29 is transmitted to the shaft 108, and with the belt 111 engaged with the pulleys 106, 109, drive is transmitted from the shaft 108 to the shaft 105 for driving the emery wheel 104. Suitably mounted on the casing 16 is a bracket 114 for supporting the knife in operative position to the wheel 104 to facilitate sharpening of the knife or other device.

It is thought that a clear understanding of the invention will be had from the foregoing description; and now again referring to certain details of construction, it will be seen that suitable latch means 115 is provided for releasably securing the hopper 7 in alinement with the casing 6.

Even though I have herein shown and described the preferred embodiment of the invention, it is to be understood that the same is susceptible of further changes, modifications and improvements coming within the scope of the appended claims.

Having thus described my invention, what I claim as new is:

1. In a meat press, a casing provided with an inlet and an outlet, a pair of intergeared drums mounted in the casing between the inlet and the outlet, means for feeding comminuted meat to the drums including a nozzle arranged in the inlet and having a discharge end extending into the casing and provided at said discharge end with a shield having upper and lower transversely curved portions disposed concentric to said drums, cutting means on the periphery of one of said drums, and the other of said drums having a groove in its periphery together with ribs at opposite sides of the groove and alined one with the other for cooperation with the cutting means for cutting the homogenous mass of comminuted meat particles into individual meat balls.

2. In a device of the character described, a pair of intergeared drums, one of said drums being provided with cutting means on the periphery thereof, and the other of said drums having a groove in its periphery and ribs on opposite sides of the groove alined with one another, and means for feeding comminuted food particles to the drums including a nozzle and a shield at one end of the nozzle having upper and lower transversely curved portions disposed concentric to the drums.

GEORGE T. KIMURA.